Patented Feb. 5, 1929.

1,701,473

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF PRODUCING DIACETONE ALCOHOL.

No Drawing.   Application filed March 19, 1926.   Serial No. 96,079.

This invention relates to a process of producing diacetone alcohol, and particularly to the treatment of an aliphatic ketone such as acetone to form this compound by means of the action of catalytic amounts of alkali metal hydroxide.

While the use of alkali metal hydroxides has previously been known, they have not been as successful to date as has the use of alkaline earth hydroxides. Edmonds (U. S. Patent No. 1,550,792) has stated "that the alkali hydroxides are inherently unsuitable as catalyzers in this reaction for the reason that they cause a further polymerization of diacetone alcohol and a resinification of acetone, which products discolor the diacetone alcohol and reduce the yield obtained."

It would seem that in previous attempts the use of the caustic alkalies has been unsuccessful to a large degree, mainly because too large amounts of these alkalies have been used.

Previous investigators have not realized that extremely small catalytic amounts of caustic alkalies are more effective and produce good yields (12 to 13 per cent) of diacetone alcohol, without such discoloration as has heretofore been produced. For example, such small amounts of potassium hydroxide as 1 part to 1 million parts of acetone has been found to increase the boiling point of the acetone. Larger amounts are necessary for good yields of diacetone alcohol, since the time required for the formation of a given amount of diacetone alcohol is partially influenced by the alkali concentration, as well as by the temperature. The reaction apparently is controlled by the three main factors, time, temperature and alkali concentration, and the three are interdependent. Low temperatures tend to increase time factor, high temperatures decrease same, but are apt to cause discoloration (resinification) of the acetone. Accordingly I prefer to conduct the reaction at room temperature approximately 20–30° C. in order that resinification may be avoided and time factor not unnecessarily prolonged.

In general, I prefer to use a substantially catalytic proportion of alkali metal hydroxide, say from one-hundredth to two-hundredths of one per cent of potassium hydroxide (85 per cent commercial grade) by weight of the acetone employed, although I may use as much as one-tenth of one per cent in some cases. Such amounts of alkali metal hydroxide are considered truly catalytic for by their presence acetone is caused to condense to diacetone alcohol without permanent discoloration or resinification. By the term "substantially catalytic proportion" I mean to imply such concentrations of alkali as will effect the formation of diacetone alcohol without inducing resinification, said concentrations generally being about one-hundredth of one per cent to one-tenth of one per cent by weight of the acetone employed. The caustic is very finely powdered, and while it may be dissolved in various solvents, I do not find this particularly desirable, so that in the preferred form of my invention I may introduce the finely powdered alkali metal hydroxide (alone or impregnated on some suitable inert carrier, such as asbestos fibre, and the like) into the acetone and agitate the mixture by mechanical means, until the alkali has been properly dispersed. Agitation may be used throughout, or may be discontinued as soon as the alkali has been dispersed, but, in general, I prefer the continuous agitation.

According to my invention I may proceed as follows:

To 500 parts by weight of acetone I may add one-tenth part by weight of (0.02 per cent) potassium hydroxide with agitation at room temperature (20–30° C.) After three hours the yield of diacetone alcohol is approximately 3½ per cent. Agitation may then be stopped and the mixture allowed to stand. After nineteen hours the yield of diacetone alcohol is approximately 12 per cent. If continuous agitation be employed, this yield may be obtained in a somewhat shorter period. Using this procedure I obtained a mixture which is very slightly discolored, but not permanently so, for upon neutralization of the alkali the color entirely disappears.

While I prefer to carry out the reaction at room temperature, or temperatures not substantially over 30° C., or less than 20° C., I may, in some cases, use lower or higher temperatures, and do not wish to limit myself to the sole use of these temperatures.

The use of such extremely small catalytic amounts of alkali hydroxide renders it necessary to use a neutral grade of acetone and I find it advisable to employ such grades of acetone as are not only free from acid, but also from such impurities as methyl acetate or other esters. The presence of small amounts of water or methyl alcohol is not as objectionable, although in general, I prefer to use a pure grade of dry acetone.

Such small catalytic amounts of alkali metal hydroxide as I employ come within that zone which ordinarily may be expressed by pH values.

It is within the scope of my invention to so arrange the several steps of my process that the operations may be conducted in a continuous manner.

Various acids may be used for the neutralization, but in general, I prefer to use one such as tartaric acid whose potassium salt is insoluble in the mixture and may be readily filtered off, when the mixture can be fractionated and the excess acetone again used. Some other suitable acids which may be employed are citric, acetic, lactic, phosphoric, sulphuric and hydrochloric. Most any acid may be employed, providing it is used in amount only sufficient to exactly neutralize the alkali metal hydroxide.

In addition to the diacetone alcohol, I find that in some cases small portions of other acetone condensation products are formed by my process and these may be recovered during the distillation.

Although I prefer to recover the diacetone alcohol by distillation it also is within the purview of my invention to recover the diacetone alcohol by separation from acetone with saline substances, i. e., by a process commonly known as "salting out". One of the important features of my invention consists in recovering the unconverted acetone and re-using again by introduction of fresh alkali metal hydroxide whereby practically all of the acetone may be converted to diacetone alcohol.

In the place of potassium hydroxide I can employ other alkali metal hydroxides such as for example sodium hydroxide and it is also within the purview of my invention to use combinations of truly catalytic amounts of the alkali metal hydroxides with alkali metal carbonates, alkaline earth hydroxides and other suitable alkaline substances.

What I claim is:—

1. The process of producing diacetone alcohol, which comprises the treatment of acetone with about 0.01 to .02% of alkali metal hydroxide in the absence of a solvent therefor, allowing same to react at a temperature not substantially over 30° C., then neutralizing the alkali and fractionally distilling to collect the diacetone alcohol so formed.

2. The process of producing diacetone alcohol, which comprises the treatment of acetone with about 0.01 to .02% of alkali metal hydroxide in the absence of a solvent therefor, allowing same to react to a temperature not substantially above 30° C., until a substantial proportion of diacetone alcohol is present in the liquid and subsequently separating the diacetone alcohol from the other constituents present.

CARLETON ELLIS.